May 12, 1931. B. O. TILDEN Re. 18,065
WATER CLOSET BOWL
Original Filed Oct. 15, 1929
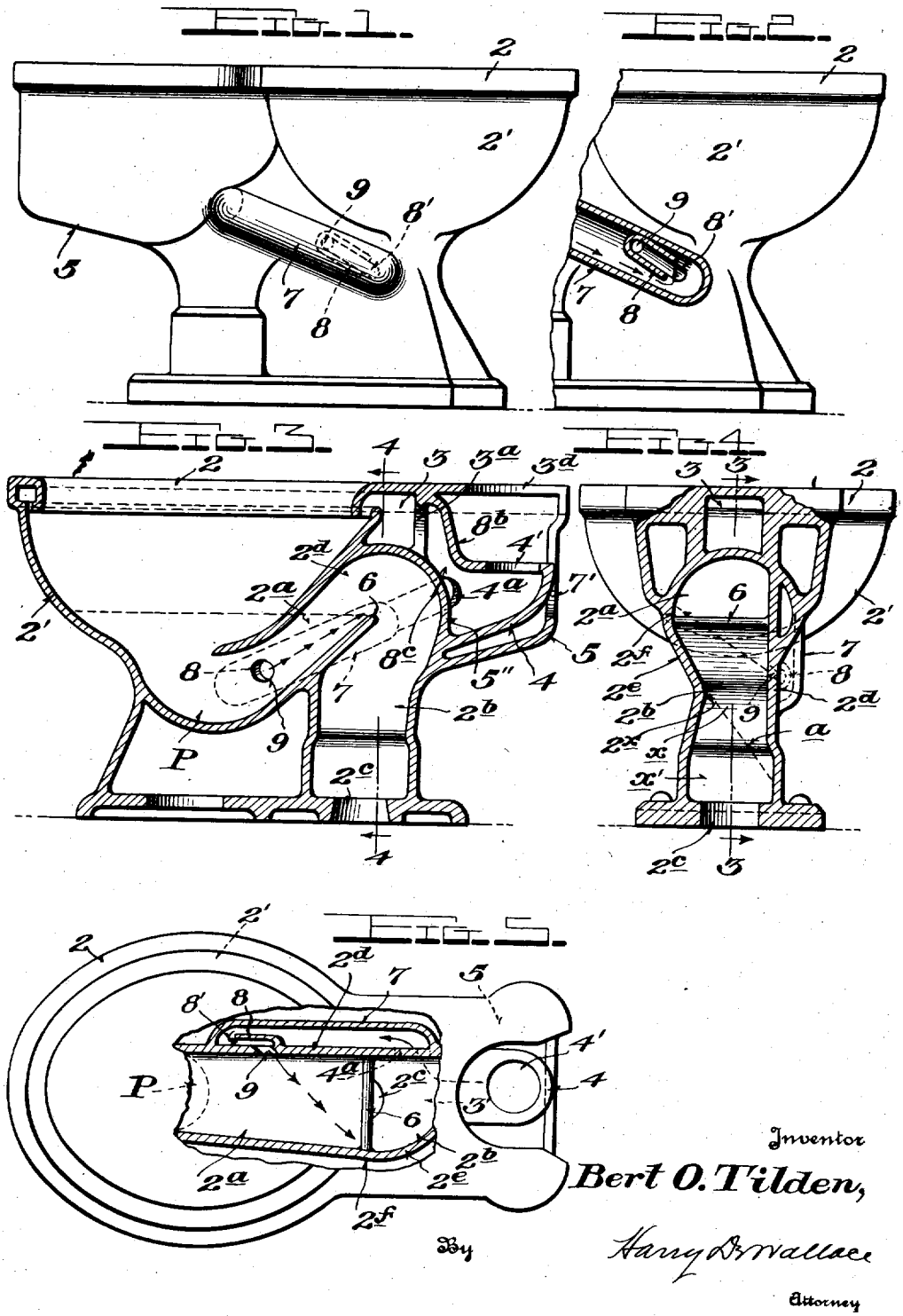
Inventor
Bert O. Tilden,
By Harry D. Wallace
Attorney Reissued May 12, 1931

Re. 18,065

UNITED STATES PATENT OFFICE

BERT O. TILDEN, OF TRENTON, NEW JERSEY, ASSIGNOR TO B. O. T. MFG. CO., OF TRENTON, NEW JERSEY, A CORPORATION OF NEW JERSEY

WATER CLOSET BOWL

Original No. 1,748,197, dated February 25, 1930, Serial No. 399,836, filed October 15, 1929. Application for reissue filed September 30, 1930. Serial No. 485,541.

This invention relates to water closet combinations of the siphon jet type, and has for its object to improve the jet structure of my former Patent No. 1,362,062, dated December 14, 1920, whereby the stream of the flushing water is delivered from one side of the up-leg, at a considerable distance above, instead of directly from the bottom of the well, which together with the up-leg forms the water seal or trap of the bowl. By thus positioning the jet opening, the distance the water must flow to reach the crest of the dam is materially shortened, which tends to greatly quicken the siphon action of the closet. But its greatest value lies in the elimination of the old jet structure, which according to my former patent, followed the usual practice of forming the jet opening in the bottom of the well of the bowl, and then molding upon the under surface of said bottom a hollow clay part that communicates by a lateral with the usual by-passage that supplies water to the jet. This old structure has always been a source of more or less trouble, due to shrinkage checking or cracking, either during the kiln firing, or by the action of frost in winter, and caused leakage and discarding of the bowl. In the present case, the jet nozzle is disposed wholly within an external passage located at one side of the bowl proper, discharges through the adjacent wall of the up-leg, which facilitates the directing of a powerful jet in a diagonal course across said leg to create the zig-zag discharge referred to in the former patent.

A further object of the invention is to provide a novel construction of bowl whereby a normally open rearwardly extending housing is afforded to receive and shield the off-set or spud connections between the flush tank and bowl, which connections heretofore have been exposed, and further to provide a housing which encloses and protects a hollow lip having a part which cooperates with the inlet chamber to direct water into the latter as well as into the rim that supplies the bowl interior, the lip thereby functioning as a common supply for the rim and bowl.

The various features and parts of the invention will be understood from the detailed description which follows, and by reference to the accompanying drawings, in which—

Figure 1 is a side elevation of a closet bowl, showing the external hollow rib. Fig. 2 is a broken side elevation showing the rib in section, also showing in section the jet passage within the rib. Fig. 3 is a central vertical longitudinal section, taken on line 3—3 of Fig. 4, showing the jet opening located in the up-leg of the discharge passage. Fig. 4 is a vertical cross-section taken on line 4—4 of Fig. 3. And Fig. 5 is a broken top plan view of the bowls of Figs. 1 and 3, showing the siphon structure in section, also showing the proximity of the jet opening to the crest of the dam, and the course of the siphoning stream to and from said opening.

In the drawings, the bowl 2 substantially conforms to the showing of my former patent, and comprises what is known as a reverse-type siphon jet closet bowl, 2′ is the usual flushing rim, which receives the water from an inlet chamber 3, the latter in turn receiving the water from a rearwardly extending hollow lip 4, which is disposed within a similarly projecting housing 5. The lip 4 is formed with an upwardly facing opening 4′ to which the usual off-set or spud connections leading from the flush tank (not shown) may be applied and hidden by the housing. 2*a* represents the up-leg of the siphon structure, by which the bowl is emptied. 2*b* is the down-leg of said structure, which communicates with the up-leg at the crest of the usual dam 6, to form a continuous passage for the contents of the bowl to the soil-pipe via a bottom opening 2*c* (see Figs. 3, 4 and 5).

The forward end of the housing 5 is formed by the wall 3*a* and the adjacent bulge 5″ of the down-leg 2*b*. The housing has a relatively large opening 7′ at its rear end and the top of the housing, which forms a shelf, has an opening 3*d* to receive and afford access to the off-set or spur connections, not shown, as above mentioned. A wall 8*b* extends upwardly and forwardly from the top 8′ of the lip and joins the wall 3*a* and forms together with the bulge 5″ a passage 8*c* via which a portion of the water reaches the rim 2, while the remainder of the water flows into the hollow rib 7, and thence into the bowl.

It will thus be seen that the housing 5 encloses and protects the lip 4, the lip not only conveying water into the rim 2 but also into the bowl interior, thus functioning as a common supply for the rim and bowl.

One lateral wall 2*d*, of the discharge passage, is preferably disposed in a vertical plane, as best seen in Fig. 4, while the opposing wall 2*e* bulges outwardly, as shown at 2*f* in Figs. 4 and 5, for deflecting a portion of the up-flowing discharge towards the said point by the force of the jet, as explained. After the said diverted portion of the discharge from the bowl gravitates from the dam, it encounters an opposing bulge 2*x*, which causes the stream to shoot, in the form of a sheet, across the bore of the down-leg and impinge the opposite wall 2*d*, as indicated by the oblique dotted line *a* in Fig. 4. This divides the down-leg momentarily into two chambers *x* and *x'*, the chamber *x'* containing any air that may be present in the down-leg when the siphon action starts, and prevents the air from rising and destroying the siphon action inaugurated by the flushing operation. The contents of the bowl thereafter continue to descend from the dam and form or build up a solid plug or mass of water in the chamber *x*, and as its weight increases, the air trapped in chamber *x'* becomes highly compressed, and is finally forced downwardly into the soil pipe.

The portion of the flushing water that supplies the jet in the present case, gravitates from the inlet chamber 3', or more particularly from an opening 4*a* of the hollow lip 4, by means of an oblique hollow rib 7 that is imposed or molded upon the external surface of the wall 2*d*, as shown in the several views. The rib 7 extends from the port 4*a* to about the plane of the bottom of the well *p*, and within said rib is formed a smaller hollow rib 8, the latter having a normally open lower end 8', and its upper end terminating at an opening 9, which is formed in the adjacent wall 2*d* of the up-leg (see Figs. 2, 3 and 5). The rib 8 is preferably disposed at an angle relatively to the longitudinal axis of the rib 7 in order to direct the jet diagonally across the up-leg towards the point 2*f*, as explained. By disposing the receiving end 8' of the jet rib near the bottom end of the passage 7, the discharge from rib 8 is effected by substantially the full force of the flushing head, and the jet opening 9, being disposed in a higher than normal plane, as compared with the older style jet openings of the well, the jet is able to start the siphon action practically instantly. This, when taken with the means for entrapping and disposing of the atmospheric pressure in the down-leg, as explained, greatly accelerates the emptying of the bowl, which is very desirable. The added feature of the housing 5 and the lip 4 of the present case, is merely for the purpose of showing the adaptability of my novel and simple jet structure to the old, as well as to the latest improved standard siphon jet closet bowls.

Having thus described my invention, what I claim, is—

1. A siphon jet water closet bowl having a flushing rim and up and down legs to discharge the contents of the bowl, a hollow rib molded to a lateral wall common to said legs, said wall having a jet opening within the up-leg above the plane of the well of the bowl, and a rib of smaller caliber disposed within the larger rib adapted to discharge the water received from the larger rib through said opening and towards the top of the up-leg to initiate the siphon action of the bowl.

2. A water closet bowl including a flushing rim, up and down legs for discharging the contents of the bowl, a hollow rib molded to a lateral wall common to said legs, an inlet chamber communicating with the rim and said hollow rib, said wall having a jet opening within the up-leg, and a smaller hollow rib molded to said wall within the larger rib adapted to discharge the contents of the larger rib through said opening at an angle to the axis of the larger rib and said up-leg.

3. A siphon jet water closet bowl including a flushing rim, an inlet chamber, and up and down legs for emptying the bowl, one wall common to said legs being perforated between the ends of the up-leg, a hollow rib molded to said wall communicating with said chamber adapted to conduct a portion of the flushing water forwardly and downwardly substantially to the plane of the well of the bowl, and a smaller hollow rib molded to said wall within the lower end portion of the larger rib and communicating with the latter rib adapted to discharge a jet through said opening towards the top of the up-leg.

4. A siphon jet water closet bowl having in combination with the flushing rim, a flushing inlet communicating with the rim and up and down legs for the venting of the bowl, and having one wall common to said legs disposed in a vertical plane, of a hollow rib molded to said vertical wall, said rib communicating with said inlet and extending obliquely substantially to the plane of the well of the bowl, and a smaller hollow rib molded within the larger rib and disposed at an angle to the longitudinal axis of the larger rib adapted to discharge a jet of water through an opening located within the up-leg in a diagonal course across the up-leg to start the siphon action of the bowl.

5. In a water closet combination, a bowl having a flushing rim and an inlet chamber communicating therewith, and also having a rearwardly extending shelf, a housing at the rear of the bowl underlying said shelf and enclosing said chamber and having its bottom extending below the chamber, and a hollow lip enclosed within the housing and having a perforated horizontal portion and an upwardly extending portion which latter is disposed rearwardly of and spaced from the inlet chamber and coacts therewith to form a passage that directs water into said inlet chamber, and the bowl having a passage which leads from said lip into the bowl interior.

6. In a water closet combination, a bowl having a flushing rim and an inlet chamber communicating therewith, and also having a rearwardly extending shelf, a housing at the rear of the bowl underlying said shelf and enclosing said chamber and having its bottom extending below the chamber, and a hollow lip enclosed within the housing and having a perforated horizontal portion and an upwardly extending portion which latter is disposed rearwardly of and spaced from the inlet chamber and coacts therewith to form a passage that directs water into said inlet chamber.

7. In a water closet combination, a bowl having a flushing rim, a housing at the rear of the bowl, and a hollow lip within the housing having a perforated portion to receive a flushing connection and having an upwardly extending portion which is disposed spaced from and rearwardly of the rim and which acts to direct water into the rim.

8. In a water closet combination, a bowl having a flushing rim and an inlet chamber communicating therewith, a housing at the rear of the bowl, a hollow lip enclosed within the housing having a perforated portion to receive a flushing connection and having an upwardly extending portion spaced rearwardly from the inlet chamber and coacting therewith to form a passage to direct water into the chamber, and the bowl having a passage to direct water from the lip into the interior of the bowl.

9. In a water closet combination, a bowl having a flushing rim and a down-leg provided with a bulge adjacent to its upper end, said rim having an inlet above the bulge, a hollow lip extending rearwardly of the bulge and having a water inlet and further having a part spaced from and disposed opposite to the bulge and which coacts therewith to form a passage to direct water into the rim inlet, and means extending from the bowl and into the passage at a point outwardly beyond the bulge to direct water from the lip into the bowl.

10. In a water closet combination, a bowl having a flushing rim provided with an inlet and also having a downleg formed with a bulge adjacent to its upper end, a hollow member provided with an inlet and projecting rearwardly of the bowl and having a bottom extending outwardly from the lower part of the bulge and having an upper part extending opposite to and spaced from the bulge to coact therewith and form a passage which extends upwardly to the rim inlet, and means entering the chamber at a point rearwardly of the bulge for conducting water from the chamber into the bowl.

11. In a water closet combination, a bowl having a flushing rim provided with an inlet and also having a down-leg, a hollow member provided with an inlet and projecting rearwardly of the bowl and disposed over the upper end of the down-leg, said member having a part cooperating with the upper end of the down-leg to form a passage which directs water into the rim inlet, and means entering the chamber rearwardly of the down-leg for conducting water from the chamber into the bowl.

12. In a water closet combination, a bowl having a flushing rim, and an inlet chamber communicating with the rim, and a hollow lip extending rearwardly of the bowl and having a part disposed spaced from and rearwardly of the inlet chamber and which is connected to the rear wall of the latter, for directing water into the inlet chamber, said lip having an inlet to receive water from a flushing connection.

In testimony whereof I affix my signature.

BERT O. TILDEN.